US009133050B2

(12) United States Patent
Schneider et al.

(10) Patent No.: US 9,133,050 B2
(45) Date of Patent: Sep. 15, 2015

(54) GLASS BODIES AND METHODS OF MAKING

(75) Inventors: Vitor Marino Schneider, Painted Post, NY (US); Changyi Lai, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 1633 days.

(21) Appl. No.: 12/270,092

(22) Filed: Nov. 13, 2008

(65) Prior Publication Data

US 2010/0115997 A1 May 13, 2010

(51) Int. Cl.
*C03B 19/00* (2006.01)
*C03B 5/235* (2006.01)
*C03B 19/09* (2006.01)
*C03C 17/00* (2006.01)

(52) U.S. Cl.
CPC .......... *C03B 19/00* (2013.01); *C03B 5/235* (2013.01); *C03B 19/09* (2013.01); *C03C 17/007* (2013.01); *C03C 17/008* (2013.01); *C03C 2217/28* (2013.01); *C03C 2217/42* (2013.01); *C03C 2218/13* (2013.01)

(58) Field of Classification Search
USPC .................................................. 65/33.1, 33.2
See application file for complete search history.

(56) References Cited

U.S. PATENT DOCUMENTS

| 3,873,339 | A |   | 3/1975 | Hudson ........................... 117/17 |
| 6,064,034 | A | * | 5/2000 | Rieck ........................ 219/121.85 |
| 2006/0192322 | A1 |   | 8/2006 | Abe et al. |

FOREIGN PATENT DOCUMENTS

| GB | 1 307 263 | 2/1973 |
| GB | 1307263 | 2/1973 |
| JP | 1979-010318 | 5/1979 |
| JP | 1980-041638 | 10/1980 |
| JP | 04-053901 | 2/1992 |
| JP | 2005-062832 | 3/2005 |

OTHER PUBLICATIONS

Veiko et al.; "Phase-structure transformations of glass-ceramics under laser heating as a way to create new microoptical components and materials", Proc. of SPIE, vol. 5399, 2004.
Veiko et al., "Laser amorphisation of glass-ceramics (LAGS) laws and new possibility to form a number of microoptical components", Proc. of SPIE, vol. 5063, 2003.
Moller et al., "Improved light out-coupling in organic light emitting diodes employing ordered microlens arrays", Journal of Applied Physics, vol. 91, No. 5, 2002.
Naessens et al., "Microlens fabrication in PMMA with scanning excimer laser ablation techniques", Proceedings Symposium IEEE/LEOS Benelux Chapter, 2000.
Pilletteri et al., "Laser surface melting and cutting of cordierite substrates", Journal of Materials Science Letters, vol. 9, pp. 133-136, 1990.
Razavy et al., "Effect of laser surface melting upon the devitrification of plasma sprayed cordierite", Material Science and Engineering, A 362, pp. 213-222, 2003.

(Continued)

*Primary Examiner* — Joseph S Del Sole
*Assistant Examiner* — Russell Kemmerle, III
(74) *Attorney, Agent, or Firm* — Jason A Barron

(57) ABSTRACT

Glass bodies and methods of making glass bodies and more particularly glass bodies, for example, microlenses and arrays of microlenses and methods of making the same are described. Cordierite powder is vitrified to form a glass body or glass bodies for instance a microlens or microlenses.

20 Claims, 3 Drawing Sheets

(56) References Cited

OTHER PUBLICATIONS

Veiko et al., "Laser modification of structure and properties of glass-ceramics", Proc. of SPIE, vol. 5339, pp. 250-257, 2004.

Veiko et al., "Physical fundamentals of laser forming of micro-optical components", Optical Engineering, vol. 33, No. 11, Nov. 1994.

Veiko et al., "Laser modification of glass-ceramics structure and properties: a new view to traditional materials", Proc. of SPIE, vol. 5662, 2004.

Guo et al., "Micro lens fabrication by means of femtosecond two photon photopolymerization", Optics Express, vol. 14, No. 2, pp. 810-816, 2006.

Naessens et al., "Flexible fabrication of microlenses in polymer layers with excimer laser ablation", Applied Surface Science, vol. 208-209, pp. 159-164, 2003.

Lee et al., "A simple method for microlens fabrication by the modified LIGA process", Journal of Micromechanics and Microengineering, vol. 12, pp. 334-340, 2002.

Moon et al., "Fabrication of polymeric microlens of hemispherical shape using micromolding", Optical Engineering, vol. 41, No. 9, pp. 2267-2270, 2002.

Wang et al., "Multilevel diffractive microlens fabrication by one-step laser-assisted chemical etching upon high-energy-beam sensitive glass", Optics Letters, vol. 23, No. 11, pp. 876-878, 1998.

Lu et al., "Direct write of microlens array using digital projection photopolymerization", Applied Physics Letters, vol. 92, pp. 0411091-1-0411091-3, 2008.

StockerYale website—http://www.stockeryale.com/i/lasers/accessories/diff_gratings.htm; "Diffractive Optical Elements (DOEs)", printed on Nov. 7, 2008.

Veiko et al., "Fast and reversible phase-structure modifications of glass-ceramic materials under CO2-laser action", Proc. of SPIE, vol. 6606, 2007.

Veiko et al., "Physical mechanisms of fast structure modification of glass-ceramics under CO2-laser action", Proc. of SPIE, vol. 6458, 2007.

Veiko et al., "Laser amorphisation of glass ceramics: basic properties and new possibilities for manufacturing microoptical elements", Quantum Electronics, vol. 37, No. 1, pp. 92-98, 2007.

Veiko et al., "Phase-structure transitions of glass-ceramics under IR-laser action: main peculiarities", Proc. of SPIE, vol. 6161, 2006.

Kieu et al., "Spherical microcavity resonator fabrication based on laser technology", Proc. of SPIE, vol. 5662, 2004.

Kieu et al., "Laser fabrication of optical microspheres", Proc. of SPIE, vol. 5399, 2004.

V.P. Veiko, at al., "Laser amorphisation of glass ceramics: basic properties and new possibilities for manufacturing microoptical elements", *Quantum Electronics*, 2007, vol. 37, No. 1, pp. 92-98.

China Office Action and Search Report received May 8, 2013, from Shanghai Patent & Trademark law Office, LLC.

JP, Application No. 2011-536418, Japanese Office Action dated Jan. 21, 2014.

Veiko, V.P., et al., *Phase-structure transformations of glass-ceramics under laser heating as a way to create new microooptical components and materials*, Proc. of SPIE vol. 5399, pp. 11-20, 2003.

Selvaraj U., et al., *Synthesis of glass-like cordierite from metal aikoxides and characterization by $^{27}Al$ and $^{29}Si$ MASNMR*, Journal of American Ceramic Society, 73 (12) pp. 3663-3669 (1990).

\* cited by examiner

GLASS BODIES AND METHODS OF MAKING

BACKGROUND

1. Field

Embodiments of the invention relate generally to glass bodies and methods of making glass bodies and more particularly to glass bodies, for example, microlenses and arrays of microlenses and methods of making the same.

2. Technical Background

Glass bodies, for example, microlenses are often used to couple light from a source to a detector (or user) and vice-versa. Many conventional microlenses are formed by cast molding of glass or plastic. Many conventional methods of making microlenses use lithographic patterning to define the general shape and size of the microlenses. Typically, the conventional methods either require the deposition or the removal of materials to define the shape after forming the microlens.

Conventional deposition methods of making microlenses on substrates have some disadvantages. This is due mainly to the mismatch of materials due to their coefficients of thermal expansion (CTE). Materials such as plastic or polymer are typically used as substrates when glass based materials are not available or can not be used due to cost or processing reasons. Alternatively, further processing steps at high temperatures of the substrate containing the microlens can damage the microlens. This is particularly true for plastic or polymer microlenses. Also several of the conventional methods require polishing of the microlenses prior to use, thus incurring an additional cost of manufacturing.

It would be advantageous to have methods of making glass bodies, for example, microlenses without the need for additional post formation processing. Further, it would be advantageous to minimize the CTE mismatches between the microlens and the substrate.

SUMMARY

One embodiment of the invention is a method of making a glass body. The method comprises providing a substrate having a surface with cordierite powder disposed thereon, and irradiating at least one discrete region of the cordierite powder such that the irradiated cordierite powder vitrifies to form the glass body. According to one embodiment, the glass body is a microlens.

Such glass bodies and/or methods of making the glass body, for example, a microlens address one or more of the above-mentioned disadvantages of conventional microlenses and/or methods of making microlenses and provide one or more of the following advantages: enhanced/customized control of shaping of the glass body, multiple potential applications for the glass bodies, reduced costs in microlens manufacturing since the need for post processing shaping is minimized, can provide different shaped microlenses on the same glass substrate at low cost, the microlenses and substrates can withstand high temperature applications, and/or customized arrays of microlenses can be made, for example, in lines or area shapes, evenly or unevenly distributed.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

DETAILED DESCRIPTION

Reference will now be made in detail to various embodiments of the invention. Wherever possible, the same reference numbers will be used throughout the drawings to refer to the same or like features.

Figure 1:
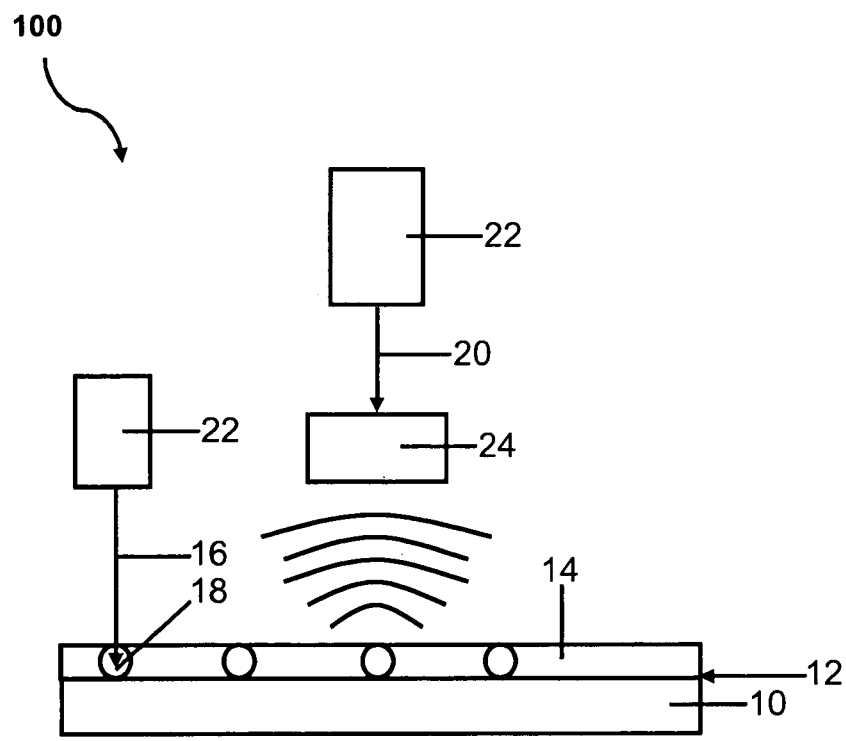
FIG. 1 is an illustration of methods of making a glass body according to embodiments of the invention.

One embodiment of the invention is a method of making a glass body. The method 100, as shown in FIG. 1, comprises providing a substrate 10 having a surface 12 with cordierite powder 14 disposed thereon, and irradiating 16 at least one discrete region of the cordierite powder such that the irradiated cordierite powder vitrifies to form the glass body 18. According to one embodiment, the glass body is a microlens.

In one embodiment, providing the substrate having a surface with cordierite powder disposed thereon comprises depositing the cordierite powder using a mold. The mold can comprise one or more holes, for example, the mold can be a frame around one center hole. The center hole can be of a corresponding shape and size to the substrate. The mold, in some embodiments, comprises a pattern of holes. The holes can be an array, for example, of discrete spots, parallel lines, or the like.

In another embodiment, providing the substrate having the surface with cordierite powder disposed thereon comprises disposing the cordierite powder in a layer having a uniform thickness. The above described mold, for example, can be used to deposit the layer having a uniform thickness.

In one embodiment, multiple discrete regions of the cordierite powder are irradiated and vitrified to form multiple glass bodies. At least two of the multiple glass bodies can be formed concurrently and/or the multiple glass bodies can be formed in series.

A parallel application of the laser power could be used to manufacturing multiple simultaneous lenses with a single laser shot, or a few laser shots for irradiating the cordierite powder.

Several techniques are available which would lead to the fabrication of more than one glass body in a single shot such as: the use of multiple laser heads or an array of fibers, the use of a micro electro mechanical system (MEMS) mirror to vitrify each discrete region individually, or the use of diffraction optics to vitrify multiple discrete regions to generate the multiple glass bodies at one time.

According to one embodiment, the multiple glass bodies are arranged in an array. The multiple glass bodies, in one embodiment are microlenses. The microlenses can be formed concurrently and/or the microlenses can be formed in series.

According to one embodiment, a photovoltaic device, a light emitting device, or a fiber connector array can comprise the microlenses.

In one embodiment, irradiating the at least one discrete region comprises irradiating with a laser. The laser, in one embodiment, is selected from a semiconductor laser, a carbon dioxide laser, a fiber laser, a Nd:YAG laser, and a combination thereof. In one embodiment, as shown in FIG. 1, the method comprises modifying the shape 24 of a beam 20 from the laser 22 prior to irradiating at least one discrete region of the cordierite powder.

The method, according to one embodiment, further comprises controlling the rate of cooling of the formed glass body by irradiating the formed glass body.

The method, according to one embodiment, further comprises heating the substrate prior to depositing the cordierite powder, during the depositing of the cordierite powder, after depositing the cordierite powder, or a combination thereof.

The substrate, in one embodiment, is heated to a temperature of 500° C. or less. The substrate, in another embodiment, is heated to a temperature of from 350° C. to 500° C. The heating can be accomplished by using a hot plate, a furnace, an induction coil, or the like.

The substrate, in one embodiment, comprises a material selected from a glass, a soda lime glass, Vycor®, display glass, high purity fused silica, a semi-conductor material, silicon, a fusion formable glass, a glass-ceramic, and a combination thereof. The glass body can be adhered to the substrate. The glass body can be not adhered to the substrate and thus can be removed from the substrate.

Figure 2:
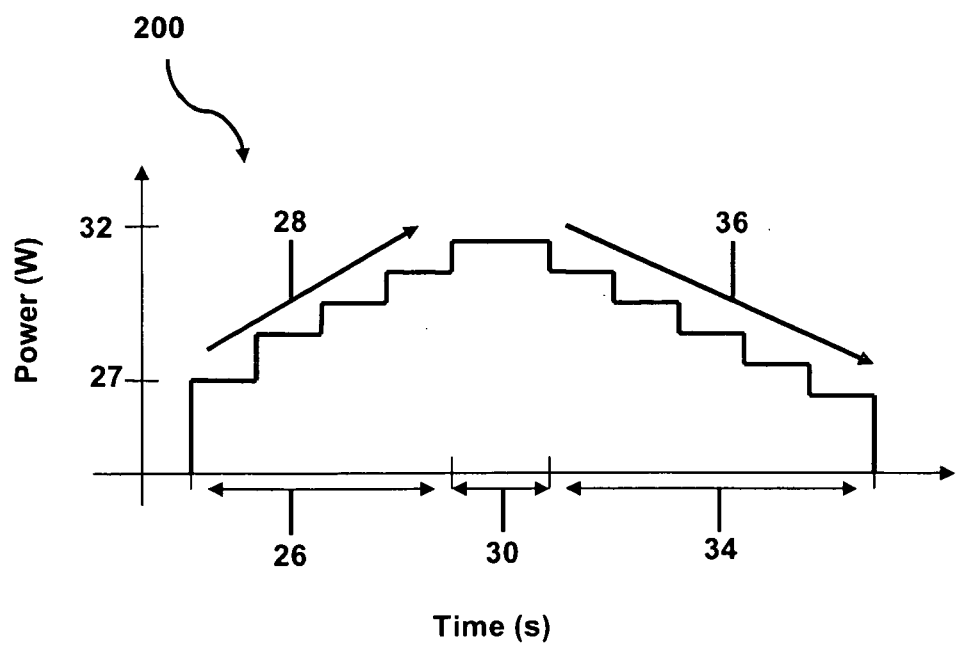
FIG. 2 is a diagram of a laser cycle according to one embodiment.

Due to the control of power and time of exposure, several different laser cycles can be used to minimize the CTE differences between the cordierite powder and the glass substrate. A diagram 200 of a laser cycle according to one embodiment is shown in FIG. 2. Initially the cordierite powder is irradiated by the laser for a duration, shown by line 26, with a power level that increases gradually from a minimum power level 27 at a certain positive rate, shown by line 28, to pre-melt the cordierite powder. Subsequently, the cordierite powder is melted and surface tension forms the microlens by irradiation of the laser for a duration, shown by line 30, with an increased power 32. Finally the formed glass body is irradiated by the laser for a duration, shown by line 34, with a power level that decreases gradually, shown by line 36, in order to reduce the thermal stress and minimize cracking of the glass body and/or substrate. The slopes of line 28 and line 36 can be adjusted depending on the desired shape of the glass body, for example, a zero slope could be used to produce a spherical glass body while a steeper slope can be used to make an arbitrary shaped glass body. According to some embodiments, the glass body is in the shape of a sphere, a cylinder, a semi-sphere, a hemisphere, a rod, a free form shape, or a combination thereof. A free form shaped glass body can be formed by irradiating regions of the cordierite powder by drawing a pattern with a laser, for example, interconnected paths of cordierite powder can be irradiated to form a free form shape.

In order to find the region where the glass bodies, for example, microlenses with arbitrary shape can be manufactured, the following parameters can be adjusted: the temperature the substrate is heated to, the power cycle of the laser, for example, the slope of the increasing and subsequent decreasing power, and the duration of the power holds during the power cycle.

If the power levels are below optimum at any instant of time in the power cycle, circular cracks can be observed on the microlenses. These circular cracks usually do not propagate through the microlens and are typically contained around the base of the microlens.

If the power levels are above optimum at any instant of time in the power cycle, major cracks on the substrate when the substrate is glass. These large cracks usually propagate through the glass substrate and are also present around the base of the microlens.

The method, according to one embodiment, further comprises cleaning the glass body. The cleaning can be done in an ultrasound bath.

EXAMPLES

The following is an example of a method of making a glass body, according to one embodiment. A semiconductor laser array operating at 810 nm was connected to a fiber bundle as part of the INTEGRA laser system available from Coherent Inc. A lens arrangement was connected to the SubMiniature version A (SMA) connector of the laser with lenses with proper coating and optical focal lengths to provide a desired Gaussian beam shape or another beam shape of choice. The laser was incident on the cordierite powder that was disposed on the substrate. The cordierite powder was disposed in a layer having a uniform thickness. In this example, a mold was placed on a surface of the substrate. The mold was filled with cordierite powder and leveled using a putty knife. The substrate in this case was Corning 1737 glass, display glass, for example, Eagle 2000™ or soda-lime glass but other materials are also possible.

The cordierite powder used had particles with a distribution from 7 μm to 47 μm in diameter. However, powders having particles with smaller diameters (a few nanometers) or larger diameters (several hundreds of microns) can also be used.

With the laser irradiating the cordierite powder, the powder was quickly melted and cooled thus changing the powder to a vitreous phase. The vitreous phase was transparent. It is expected that the glass composition of the microlens should be based on the chemical composition of the cordierite (that is Silica, Alumina and Magnesium oxide, for example, $(Mg; Fe_2^+)_2Al_4Si_5O_{18}$).

The laser system was arranged with an x-y-z controller and 3D positioning that allows the description of recipes and power control depending on the positioning. Therefore by controlling the optical power, the time of exposure, and the position, microlenses arrays were formed. These arrays can be one-dimensional (1D) or two-dimensional (2D).

The power cycles can be dependent on substrate materials. In this example, microlenses were made, according to one embodiment of the invention, on Corning 1737 glass and soda-lime glass. The microlenses were arranged in a 4×5 array. The microlenses were made using an optimal power cycle. The cordierite powder was deposited using different molds leading to different uniform layer thicknesses (h1) of deposition, for example, 250 μm, 500 μm, 1000 μm and 1500 μm. The microlenses were found to have increased heights respective to increased h1 values and more spherical respective to increased h1 values. No failure mode was detected after cleaning the microlens arrays in an ultrasound bath for 30 minutes.

Figures 3A, 3B:
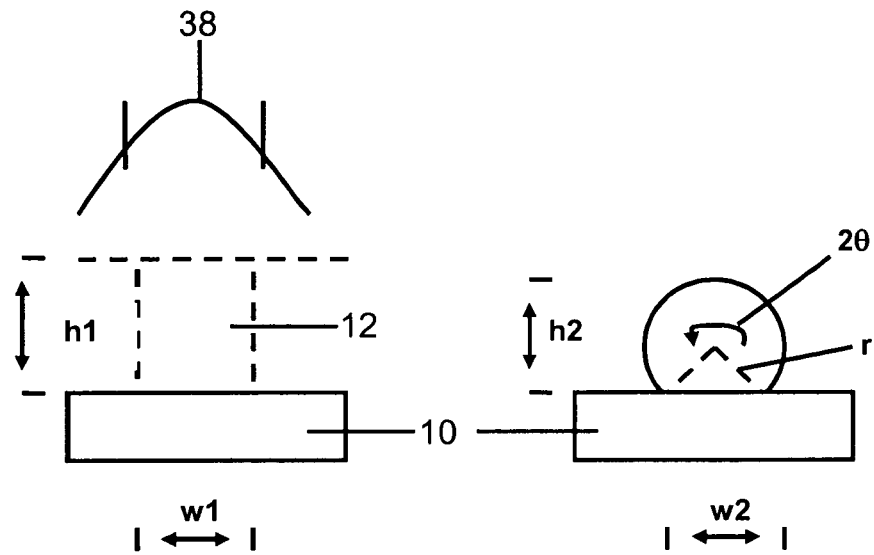
FIG. 3a and FIG. 3b illustrate exemplary geometries of cordierite powder and a glass body upon vitrification respectively.

FIG. 3a and FIG. 3b illustrate the reflow geometry of the reflow and vitrification process. In FIG. 3a, a substrate is provided having cordierite powder deposited at a height h1 and a width w1. The shape of the beam from the laser was modified to have an irradiation cylinder 38 having a w1 equivalent to the w1 of the cordierite powder. In FIG. 3b, the microlens after vitrification of the cordierite powder has an underpinned base w2 and an inner angle 2θ, a radius r, and a final height of h2. The dimensions are based on the equivalence of volume taking into account the compaction factor of the cordierite powder.

Figure 4:
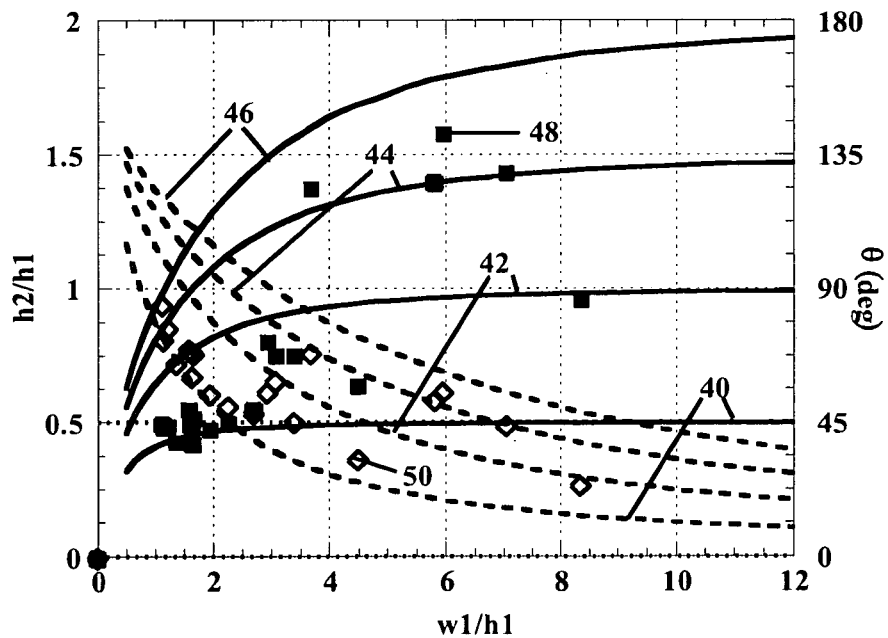
FIG. 4 is a graph of estimated geometrical features of microlenses, along with measured geometrical features of microlenses made according to the methods of the invention.

Some geometrical features of microlenses, made according to the methods of the invention, can be estimated, for example, the normalized height h2/h1 and θ as a function of the normalized width of the base w1/h1. In FIG. 4, a family of curves (full and dotted lines) with compaction ratios $\eta_{compaction}$ (0 to 1) at 25%, 50%, 75% and 100%, 40, 42, 44, and 46 respectively, are plotted. The black data points, for example, 48 and white data points, for example, 50 are the measurements made of the microlenses via a scanning electron microscope (SEM) and an optical confocal microscope. There is a good correlation between the measured microlenses and the estimated values for w1/h1<3 with a compaction factor of 25%. For w1/h1>3, the compaction factor seems to be up to 75% due to imperfection at the deposition of very thin films and the large grain size of the powder.

A sample of the cordierite powder prior to deposition and a sample of microlenses, made according to one embodiment of the invention, were analyzed by X-ray diffraction (XRD). The microlenses were manufactured on the top of a silicon wafer. The vitrified microlenses did not adhere to the silicon.

Figure 5:
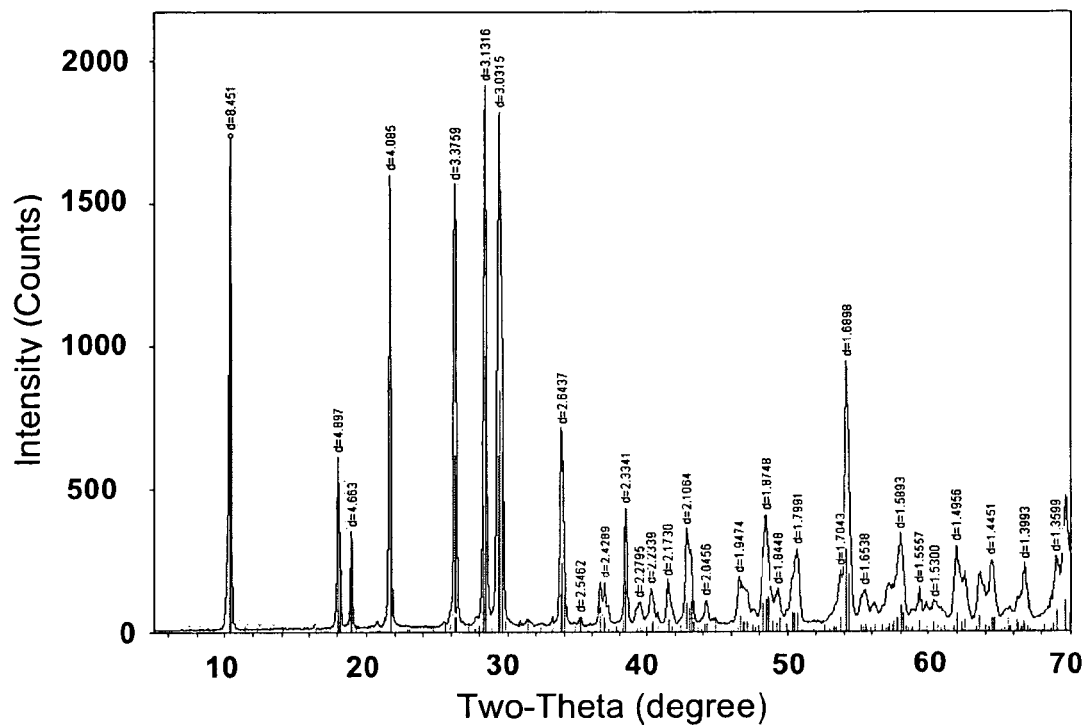
FIG. 5 is an X-ray diffraction (XRD) plot of cordierite powder.
Figure 6:
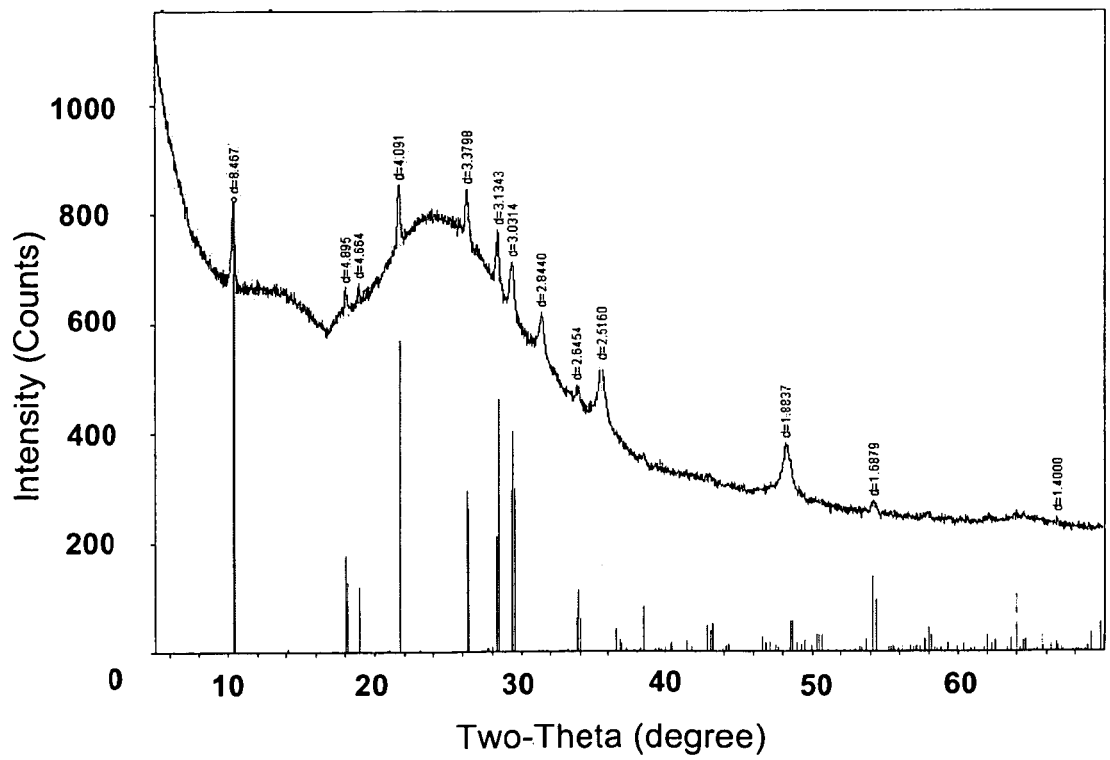
FIG. 6 is an XRD plot of a glass body made according to one embodiment.

Approximately 200 mg of the microlenses were crushed in a tungsten carbide mill (WC). Both the cordierite powder and the crushed microlenses were exposed to X-rays and diffraction patterns were recorded. The XRD plot in FIG. 5 shows that the cordierite powder is a crystalline material; while the XRD plot of the vitrified material from the crushed microlenses, shown in FIG. 6, shows that the crushed microlens material is almost completely amorphous. The amorphous material however, still has the signatures of the original cordierite plus the residue from the tungsten carbide mill used to crush the microlenses. This seems to confirm that vitrification is achieved via laser irradiation.

The microlenses, made according to one embodiment of the invention, were measured for absorption in the visible spectra. Transmission loss spectral measurements of a microlens built on Corning 1737 glass were made. Losses were observed typically around 1.5 dB in the spectral range of from 450 nm to 880 nm in the visible. Measurements taken in intervals of 1 nm with a setup based on an Ocean Optics spectrometer did not present strong peaks of absorption in the visible range.

According to one embodiment, a photovoltaic device, a light emitting device, or a fiber connector array can comprise a microlens, multiple microlenses, and/or arrays of the microlenses In order to evaluate the glass body or bodies functioning as a microlens or microlenses, a test was implemented using two different laser sources.

A $2^{nd}$ harmonic DPSS green laser was connected to a FC/PC connector with a high numerical aperture. The beam of light from the laser was dispersed by the high numerical aperture and propagated in free space after passing though a glass substrate. The laser was then butt-coupled to the microlens built on the glass substrate, in this example, a display glass. The microlens was able to collimate the beam of light, thus creating a single spot that propagated in free space. There are several applications for this type of collimation, for example, in the optics industry, for collimating light or laser beams in general.

The microlenses used in the previous example had a radius of 1018 μm, a height of 654 μm and an angle of aperture of θ=65.15. The diameter of the projected beam was approximately 3.5 inches for a height from the lens to the projection plane of 3.5 inches, leading to an aperture angle of 22.5 degrees and a numerical aperture (NA) of approximately 0.38.

A red semiconductor laser that had an output with very high level of collimation was used. In this example, the beam of light from the laser produced a single spot as it passed through a glass substrate, for example, a display glass. The laser was butt-coupled to the microlens and created a disperse three dimensional cone of light that distributed the light almost evenly. There are many applications for this type of light distribution, for example, in the optics industry as a concentrator or disperser of light.

The collimated beam of light from the laser was expanded in 3-dimensions. Since such devices are reciprocal, the device could be also used as a light concentrator in the opposite direction. The microlenses used, in the previous example, had a radius of 1018 μm, a height of 654 μm and an angle θ=65.15. The diameter of the projected beam of light from the laser was approximately 89 mm for a height from the lens to the projection plane of 85 mm leading to an aperture angle of 31.3 degrees and a NA of 0.519. The NA for such microlenses could be a function of curvature angle θ of the microlens.

The microlenses made according to the invention could be used for light concentration for, for example, photovoltaics or other semiconductor devices. In these applications, arrays of such microlenses (both 1D and 2D) on display glass or soda-lime glass could provide a cheap media to concentrate light, especially in applications where the angle of incidence of the light is variable (such as the sun moving during the day in the sky) as a concentrator, or where the tolerances of angular alignment are critical and could be mitigated by using these types of microlenses.

Yet another application for a microlens, multiple microlenses, and/or an array of microlenses can be in the extraction of light, for example, a light emitting device, for instance, to disperse the light from an organic light-emitting diode (OLED) uniformly for applications in residential lighting.

Further, a combination of light extraction and light concentrators from sources that can be with high NA such as high NA fibers and connectors or low NA such as collimated lasers, detectors, or the like can be engineered via a combination of such microlenses in 1D or 2D arrays. For example, a fiber ribbon connector such as a CAT-12 connector can be connectorized in parallel with a microlens array and provide free space collimated light for several lasers and/or fibers simultaneously. This light can then be recollimated to a photodetector array or another fiber connector enabling free space interconnectivity.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A method of making a glass body, the method comprising;
   providing a substrate having a surface with cordierite powder disposed thereon, wherein the substrate comprises a material selected from a glass, a soda lime glass, display glass, high purity fused silica, a semi-conductor material, silicon, a fusion formable glass, a glass-ceramic, and a combination thereof; and
   irradiating at least one discrete region of the cordierite powder such that the irradiated cordierite powder vitrifies to form the glass body.

2. The method according to claim 1, wherein the glass body is a microlens.

3. The method according to claim 2, wherein the glass body is in the shape of a sphere, a cylinder, a semi-sphere, a hemi-sphere, a rod, a free form shape, or a combination thereof.

4. The method according to claim 1, wherein providing the substrate having a surface with cordierite powder disposed thereon comprises depositing the cordierite powder using a mold.

5. The method according to claim 4, wherein the mold comprises a pattern.

6. The method according to claim 1, wherein providing the substrate having a surface with cordierite powder disposed thereon comprises disposing the cordierite powder in a layer having a uniform thickness.

7. The method according to claim 1, wherein multiple discrete regions of the cordierite powder are irradiated and vitrified to form multiple glass bodies.

8. The method according to claim 7, wherein at least two of the multiple glass bodies are formed concurrently.

9. The method according to claim 7, wherein the multiple glass bodies are formed in series.

10. The method according to claim 7, wherein the multiple glass bodies are arranged in an array.

11. The method according to claim 10, wherein the multiple glass bodies are microlenses.

12. A photovoltaic device, a light emitting device, or a fiber connector array comprising the microlenses made according to claim 11.

13. The method according to claim 1, wherein irradiating the at least one discrete region comprises irradiating with a laser.

14. The method according to claim 13, comprising modifying the shape of a beam from the laser prior to irradiating at least one discrete region of the cordierite powder.

15. The method according to claim 13, wherein the laser is selected from a semiconductor laser, a carbon dioxide laser, a fiber laser, a Nd:YAG laser, and a combination thereof.

16. The method according to claim 1, further comprising controlling the rate of cooling of the formed glass body by irradiating the formed glass body.

17. The method according to claim 1, further comprising heating the substrate prior to depositing the cordierite powder, during the depositing of the cordierite powder, after depositing the cordierite powder, or a combination thereof.

18. The method according to claim 17, wherein the substrate is heated to a temperature of 500° C. or less.

19. The method according to claim 1, wherein the glass body is adhered to the substrate.

20. The method according to claim 1, wherein the glass body is not adhered to the substrate.

* * * * *